March 29, 1938.　　　S. SCHNELL　　　2,112,609
BRAKING MECHANISM
Filed Feb. 3, 1934　　　3 Sheets-Sheet 1
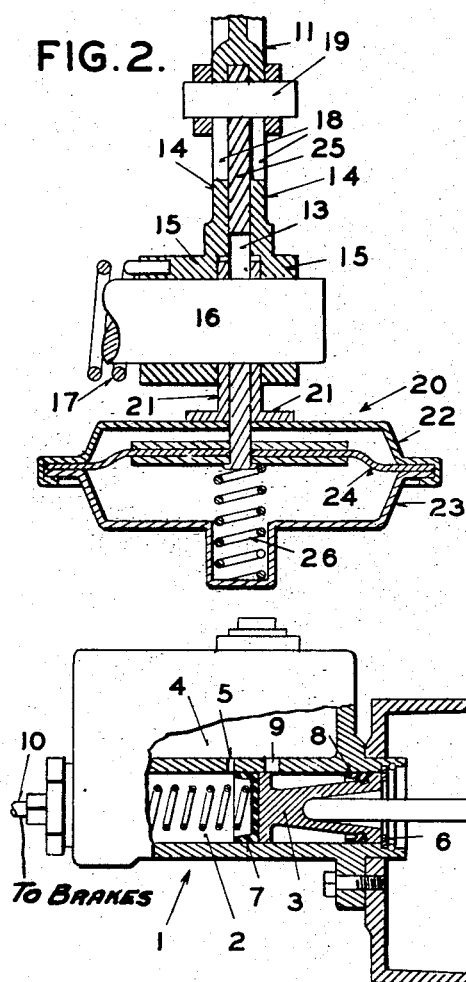
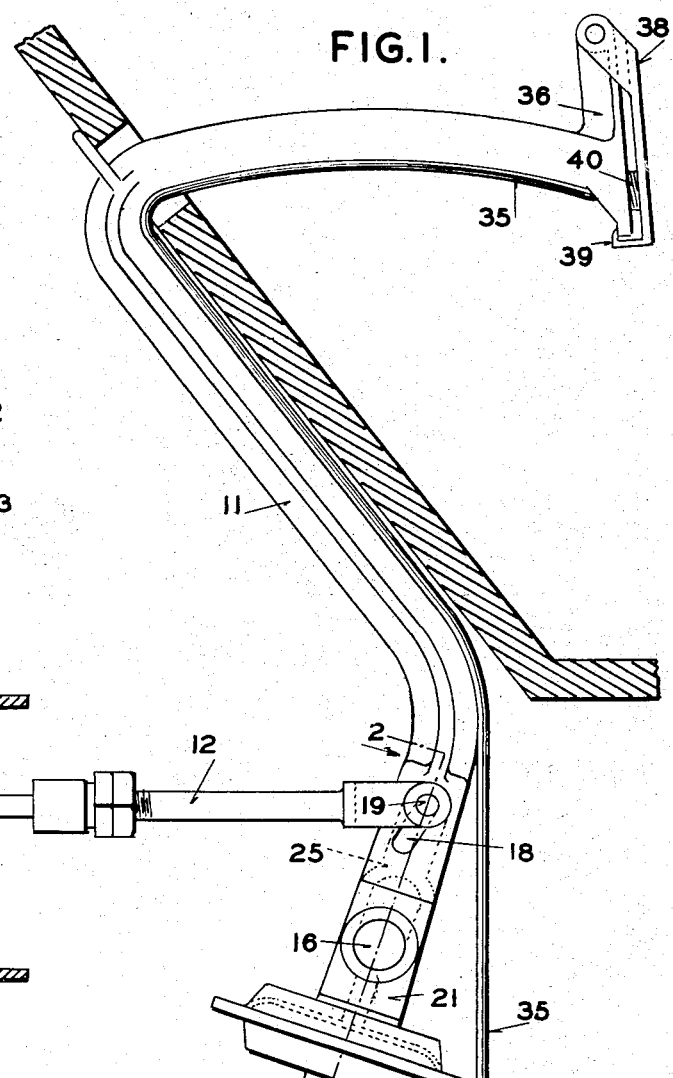
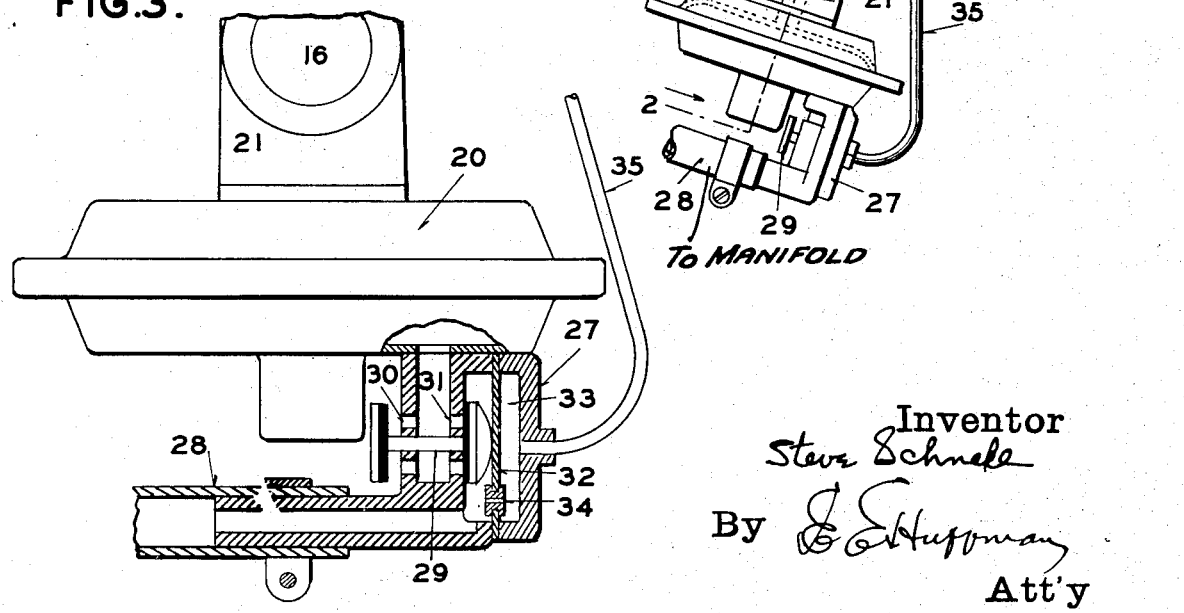
Inventor
Steve Schnell
By G. E. Huffman
Att'y March 29, 1938.   S. SCHNELL   2,112,609
BRAKING MECHANISM
Filed Feb. 3, 1934   3 Sheets-Sheet 2
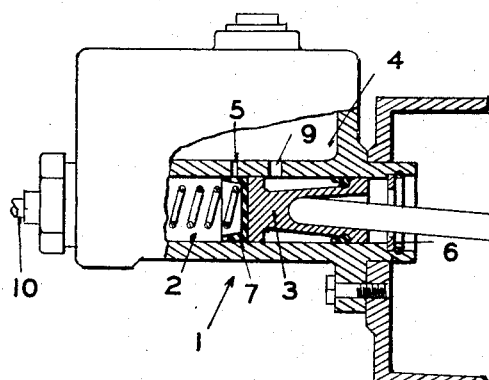
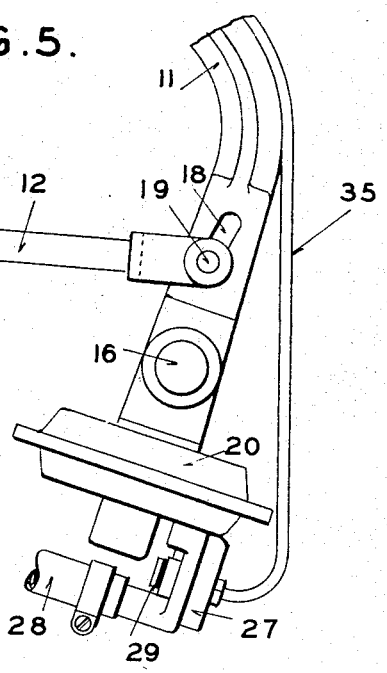
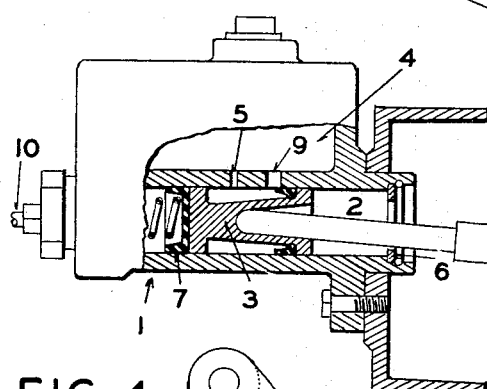
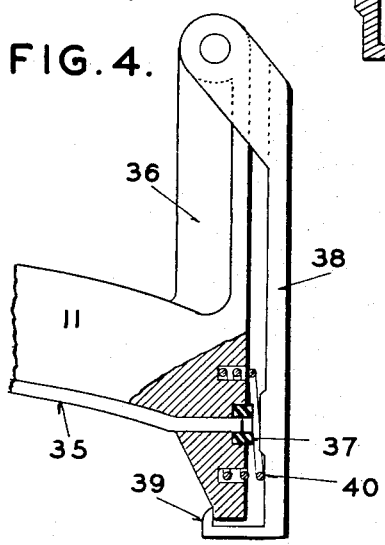
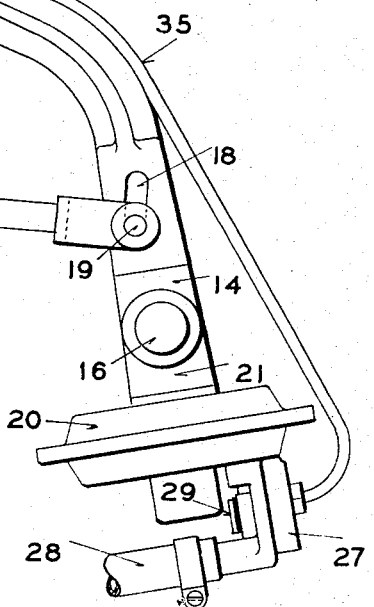
Inventor
Steve Schnell
By E. C. Huffman
Att'y March 29, 1938. S. SCHNELL 2,112,609
BRAKING MECHANISM
Filed Feb. 3, 1934  3 Sheets-Sheet 3
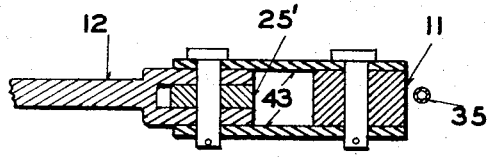
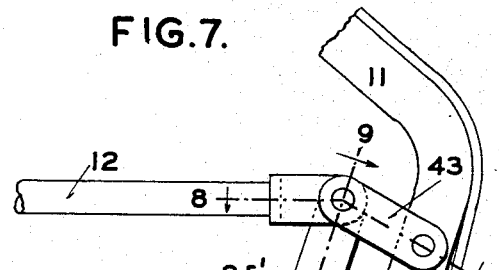
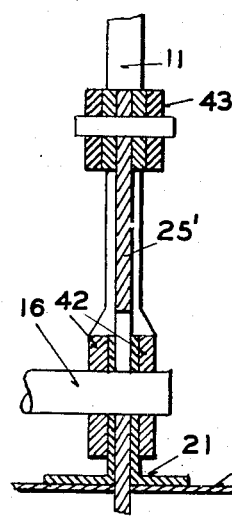
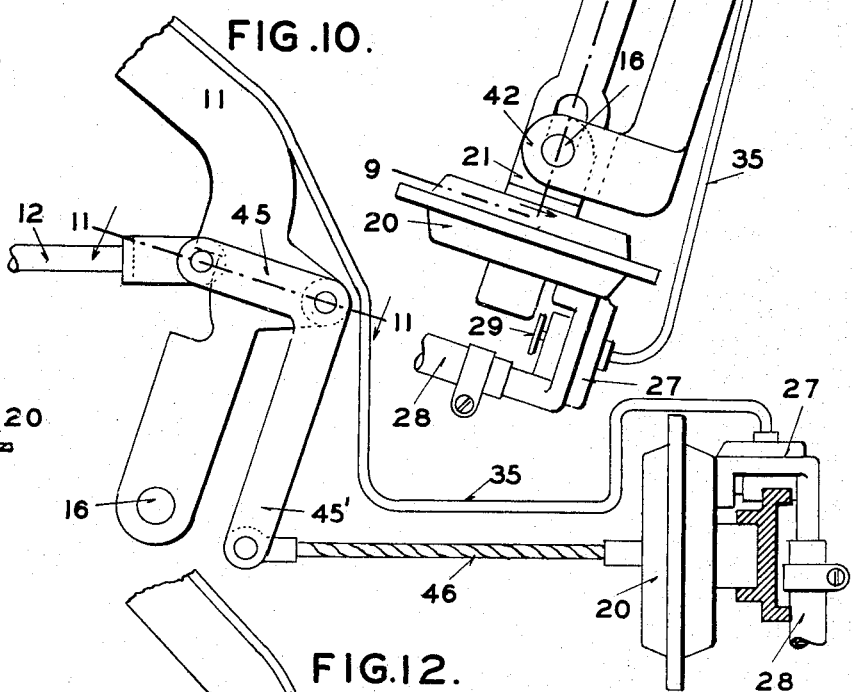
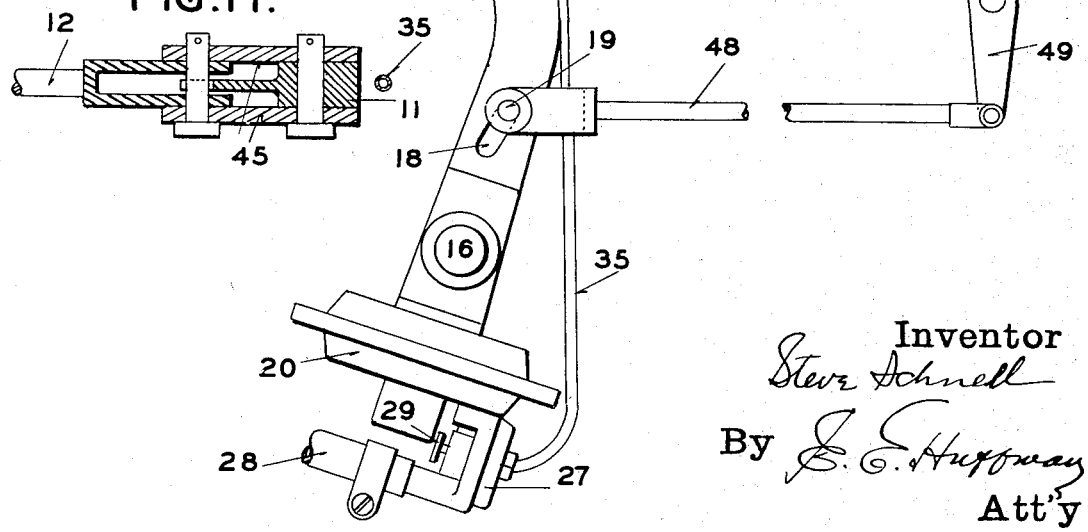
Inventor
Steve Schnell
By J. E. Huffway
Att'y Patented Mar. 29, 1938

2,112,609

UNITED STATES PATENT OFFICE 2,112,609

BRAKING MECHANISM

Steve Schnell, Overland, Mo., assignor to Wagner Electric Corporation, St. Louis, Mo., a corporation of Delaware Application February 3, 1934, Serial No. 709,553

12 Claims. (Cl. 188—152)

My invention relates to braking mechanism and more particularly to means for taking up slack in braking systems and to means for changing the pedal leverage ratio.

In both hydraulically and mechanically-actuated brakes as now manufactured, it is necessary to move the brake pedal a considerable distance before the brake shoes are brought into contact with the brake drum. This pedal movement which performs no useful work and is, therefore, a waste of physical effort, also necessitates using a smaller pedal leverage ratio since the pedal travel effective in applying braking pressure is reduced.

One of the objects of my invention is to provide a braking system with means for taking up slack in a braking system without movement of the brake pedal.

Another object of my invention is to provide power-operated means for taking up slack in a brake system, which means functions when the operator's foot is placed upon the pedal pad and before the pedal is moved.

Still another object of my invention is to provide means whereby either of several pedal leverage ratios may be employed to operate a brake without a change in the total pedal travel necessary for a given displacement of the brake actuating element.

Other objects of my invention will become apparent from the following description taken in connection with the accompanying drawings showing several embodiments thereof, in which Figure 1 is a view, partly in cross-section, of a hydraulic compressor and pedal therefor embodying my invention; Figure 2 is a cross-sectional view on the line 2—2 of Figure 1; Figure 3 is a cross-sectional view of the valve mechanism for the suction motor; Figure 4 is an enlarged cross-sectional view of the control port for the valve; Figures 5 and 6 are views similar to that of Figure 1, showing different operating positions; Figure 7 is a view illustrating a modification of the structure shown by Figure 1; Figures 8 and 9 are cross-sectional views taken on the lines 8—8 and 9—9, respectively, of Figure 7; Figure 10 is a view illustrating a further modification; Figure 11 is a cross sectional view taken on the line 11—11 of Figure 10; and Figure 12 is a view showing how the invention is embodied in mechanically-actuated braking mechanism.

Referring to Figures 1 to 6, inclusive, the numeral 1 indicates a standard type of compensating compressor used on a hydraulic brake system, this compressor is mounted on a suitable support and comprises a cylinder 2, a piston 3, and a reservoir 4. The reservoir 4 is in communication with the cylinder by means of compensating port 5 when the piston is moved to its retracted position against the stop 6 by the piston return spring, as shown in Figure 1. The piston is provided with the usual packing cup 7 and a secondary packing 8. The cylinder at the rear of the piston head is at all times in communication with the reservoir by means of the opening 9. The pipe 10 provides communication between the cylinder and each of the brake shoe actuating motors (not shown). In prior standard constructions the piston is actuated by the brake pedal through connecting means pivoted thereto.

In the construction above described, when the pedal is moved to actuate the piston to apply pressure to the system, the pedal must be initially moved a considerable distance before any braking effect is secured since the piston 3 has to be first moved past the port 5 to close the cylinder and then moved an additional distance to build up sufficient pressure to move the brake shoes into engagement with their drums. This initial pedal movement necessary to take up slack in the braking system and to secure a braking effect, may be as great as two or three inches at the pedal pad, and it often exceeds the amount of pedal movement necessary to produce the desired braking action after the slack has been taken up. This pedal movement to take up the slack in the braking system decreases the pedal travel effective in applying braking pressure and prevents the use of a greater pedal leverage ratio. Therefore, the elimination of this movement is highly desirable.

In accordance with my invention I have devised means whereby the slack in the braking system will automatically be taken up as soon as the operator's foot is placed on the pad of the pedal and without the necessity of any movement of the pedal. Also, by means of my invention I am able to employ either of two pedal leverage ratios to operate the brakes without a change in the pedal travel necessary to move the compressor piston a selected distance.

The brake pedal 11 at its pivoted end is bifurcated to form a slot 13 (Figure 2), the legs 13 being provided with a bearing boss 15 for receiving the pivot pin 16. The usual coiled spring 17 maintains the pedal in its retracted position against the floor boards of the vehicle. Each leg 14 is formed with coinciding inclined slots 18 through which extends a pin 19 for connecting the pedal to the forked end of the piston rod 12.

The slots 18 are inclined rearwardly, with respect to the vertical, when the pedal is in retracted position.

A small suction motor 20 is pivotally suspended from the pedal pivot pin 16 by means of a pair of brackets 21, this motor comprising a pair of cup-shaped members 22 and 23 between which is secured a flexible diaphragm 24 of suitable material. The purpose of this motor is to move the pin 19 from the upper ends of the slots 18 to their lower ends. The connecting means between the pin 19 and the diaphragm comprises a link 25 lying in the slot 13 formed by the legs 14 of the pedal, the lower end of which is secured to the diaphragm and the upper end to the pin 19. A suitable elongated opening in the link 25 receives the pedal pivot pin 16 and permits free longitudinal movement of the link. A spring 26 in the motor normally biases the diaphragm 24, link 25, and pin 19 to their uppermost positions.

The chamber of the suction motor formed by the cup-shaped member 23 and the diaphragm 24, is connected by means of a control valve 27 and conduit 28 with the manifold of the engine of the vehicle (not shown). The valve 27 is of well known construction and comprises a double valve member 29 for alternately opening and closing the exhaust ports 30 and the inlet ports 31. The valve is governed by a small flexible diaphragm 32 situated in a chamber 33 leading to the conduit 28 and constructed of soft leather or equivalent material whereby it may move laterally in the chamber. The diaphragm is provided with a small opening 34 providing communication between each side of the diaphragm. The portion of the chamber 33 on the side of the diaphragm opposite the double valve 29 is connected to a conduit 35 which extends up to and through the pedal pad 36, the open end of which is surrounded by a suitable rubber valve seat 37. The pedal pad has hinged thereto a secondary pad 38 for opening and closing the conduit 35 by cooperating with the valve seat 37. This secondary pad 38 is normally biased away from the seat 37 and against a stop 39 by means of a spring 40.

Referring to the operation of the structure, when the pedal is in retracted position, as shown in Figure 1, and the operator's foot is removed from the pedal pad, the right side of the chamber 33 of the control valve 27 is open to the atmosphere by way of conduit 35. The left side of chamber 33 is at all times subject to the suction of the engine and since the diaphragm opening 34 is small, the diaphragm 32 will be forced toward the left, holding double valve 29 in a position to close the inlet openings 31 and open the exhaust openings 30. The diaphragm of the suction motor, under these conditions, is subjected to atmospheric pressure on both sides and the spring 26 therein maintains the diaphragm 24 and the link 25 in the uppermost position, thus holding the connecting pin 19 in the upper ends of the slots 18. In this position of the parts the piston of the compressor is in its retracted position against stop 6, permitting the cylinder ahead of the piston to be in communication with the reservoir in the same manner as if my invention were not embodied in the brake actuating mechanism.

If it is now desired to apply the brakes, the vehicle operator places his foot on the secondary pedal pad 38, thereby moving it against the seat 37 and closing conduit 35 to the atmosphere. The pressure in both sides of the chamber 33 of the control valve will now become equal and of sub-atmospheric value because of the diaphragm opening 34, thus releasing the diaphragm pressure on valve 29. Atmospheric pressure acting on the double valve now causes the valve to "pop" over to the right, thereby closing the exhaust openings 30 and opening the inlet openings 31 and placing the suction motor in direct communication with the manifold of the engine, whereby the diaphragm 24 of the suction motor will be forced downwardly and, by means of the link 25, the pin 19 moved from the upper ends of the inclined slots 18 toward their lower ends. This movement of the pin 19 causes the piston rod 12 to be moved longitudinally to the left sufficiently to move the piston past the opening 5 and cause the piston to place the fluid in the braking system under pressure. The parts of the slack take up means should be so proportioned that the amount of pressure placed on the fluid in the braking system when the means is operated, will be sufficient to move the brake shoes into contact with their drums. Brake shoe lining wear will increase the slack in the brakes but this may be partially compensated for by having the slots of sufficient length that the pin 19 will not have to be moved all the way to the lower ends thereof to cause slack to be taken up when the brake shoes are closely adjusted with respect to their drums.

The position of the piston and piston rod, after the suction motor 20 has been operated and before the pedal has been moved, is clearly shown in Figure 5. It is to be noted that the action of the control valve and suction motor is very rapid since the suction of the engine, when the brake is applied, is generally a maximum as the result of the throttle being in "off" position. The piston is moved forwardly almost simultaneously with the placing of the operator's foot on the secondary pedal pad 38. The rapidity of the action of the control valve can be varied by varying the size of the opening 34 in the diaphragm 32.

When the brake pedal is initially moved, it continues to move the compressor piston and since the piston is already in a position where the fluid in the braking system is under pressure, a braking action results immediately. Continued movement of the brake pedal results in additional braking action. It is thus seen that by means of my invention the slack in the braking system is taken up as soon as the operator's foot is placed upon the pedal pad, and braking action is present as soon as the pedal is moved. When the foot of the operator is removed from the brake pedal, the parts return to their retracted position, as shown in Figure 1.

The angle of inclination of the slots 18 in the legs of the pedal, when the pedal is in retracted position, is such that when the pedal has completed full travel, the slots will assume a vertical position, as shown in Figure 6. This is an important feature of my invention as the pressure applied to the braking system at the end of the pedal stroke will be the same whether the slack take-up means has or has not operated.

My slack take-up means for braking systems also embodies means for increasing the leverage ratio of the pedal without in any way increasing the extent of movement of the piston for a given pedal travel. For example, if the pedal is moved when pin 19 is in the position shown in Figure 1 (the suction motor not operating), the leverage ratio will be of a given value,—say 5 to 1, considering the pedal pad as being 15 inches from the pedal pivot and the pin as being 3 inches from the pedal pivot. If the pin 19 is in the lower end of the slot when the pedal is moved (the suction motor having been operated), and if we consider the slot 18 as being approximately one-half inch long, the ratio will be 6 to 1 for then the pin 19 will only be 2½ inches from the pivot of the pedal. Regardless of the leverage ratio being used, the final position of the compressor piston for a full pedal travel will be the same, due to the fact that the slot 18 is vertical at the end of the pedal travel.

In Figures 7, 8 and 9 I have shown my invention embodied in a slightly modified construction. The pin and slot connection between the piston rod and the pedal is replaced by a toggle connection. The lower end of the pedal 11 is provided with an off-set forked end 42 which receives the pedal pivot pin 16. The forked end of the piston rod 12 is pivotally connected by a pair of links 43 with the pedal 11. The suction motor 20 and the control valve 27 are suspended on the pivot pin 16 in the same manner as in Figure 1. The connecting link 25' actuated by the suction motor 20, is connected to the pivoted connection between the piston rod 12 and the links 43. The remaining structure is the same as that shown in Figure 1. The operation of this modification is the same as that of Figure 1. When the operator's foot is placed on the secondary pedal pad, the suction motor is immediately operated and the movement of the link 25' straightens out the toggle connection between the piston rod 12 and the pedal, thus moving the compressor piston forward, taking up slack in the brakes, and changing the leverage ratio of the pedal.

In Figures 10 and 11 I have shown the links 43 of Figure 7 replaced by a pair of bell-crank levers 45 pivoted to the pedal 11. The ends 45' of the bell-crank levers extend to a point adjacent the pedal pivot 16 and are connected by means of a flexible cable 46 to the suction motor 20 mounted on a fixed part of the vehicle. When the suction motor is operated, the bell-crank levers are rotated on the pedal, thereby straightening the toggle connection between the piston rod 12 and the pedal, thus moving the compressor piston and taking up slack in the brakes.

In Figure 12 I have shown how my invention may be applied to "mechanically" actuated brakes wherein the pedal operates a cross-shaft 47 which in turn operates the brakes by suitable rodding of well known construction. The slack take-up structure illustrated is the same as that shown in Figure 1 except that the piston rod 12 is replaced by a pull-rod 48 connected to arm 49 on the cross-shaft 47. When the suction motor is operated the pin 19 is moved in the slots 18, thus moving the rod 12 longitudinally to take up slack in the braking system.

It is to be noted that a braking system equipped with my slack take-up and pedal leverage ratio changing device will always operate in the usual manner in case the device should become disabled.

Being aware of the possibility of many other modifications in the particular structures herein described, without departing from the fundamental principles of my invention, I do not intend that its scope be limited except as set forth by the appended claims.

Having fully described my invention, what I claim as new and desire to secure by Letters Patent of the United States is:

1. In braking mechanism, a brake pedal, a longitudinally movable rod for operating the brakes, connecting means between the rod and the pedal whereby the rod is movable with the pedal, said connecting means permitting said rod to be moved longitudinally independently of the pedal, means comprising a fluid motor movable with the pedal for moving said rod independently of the pedal to take up slack in the braking mechanism, and a valve on the pedal pad for governing the fluid motor.

2. In braking mechanism, a pivoted brake pedal provided with a slot inclined with respect to a vertical axis when the pedal is in an inoperative position, a longitudinally movable rod for operating the brake and provided with a pin extending into said slot, a fluid motor pivotally mounted on the pivot of said pedal, connecting means between the motor and the pin for moving the pin in the slot, a control valve for said motor, and means on said brake pedal for governing said control valve without movement of the pedal.

3. In hydraulic brake actuating mechanism, a cylinder, a piston movable therein, a reservoir in communication with the cylinder when the piston is in retracted position, a pivoted lever, a rod connected to the lever and the piston whereby the piston may be actuated by movement of the lever about its pivot, and means operable without movement of the lever for changing the leverage ratio of the lever and for simultaneously moving the rod longitudinally to thereby move the piston in pressure applying direction and cut off communication between the reservoir and the cylinder.

4. In hydraulic brake actuating mechanism, a cylinder, a piston movable therein, a reservoir in communication with the cylinder when the piston is in retracted position, a pivoted lever, a rod connected to the lever and the piston whereby the piston may be actuated by movement of the lever about its pivot, means operable without movement of the lever for moving the connection between the lever and the rod closer to the lever pivot and means for moving the rod longitudinally when said connection is moved to thereby move the piston in pressure applying direction and cut off communication between the reservoir and the cylinder.

5. In braking mechanism, a movable element for operating the brakes, an actuating member for said element, connecting means for continuously maintaining an operative connection between the actuating member and the element but permitting movement of the element relative to said member without breaking said operative connection whereby any movement of the actuating member will cause a simultaneous movement of the element, and fluid pressure-operated means for moving said element in brake applying direction without movement of the actuating member, said last named means embodying a control valve on the actuating member.

6. In braking mechanism, an element for operating the brakes, a lever, a connection between the lever and the element whereby the element may at all times be moved with each movement of the lever but permitting said element to be moved relatively to the lever, means for moving said element independently of any movement of the lever to take up slack in the braking mechanism, fluid pressure means for operating said first named means, and means comprising a valve on said lever and operable without movement of the lever for controlling said fluid pressure means.

7. In braking mechanism, a movable element for operating the brakes, a brake pedal for actuating said element, means for moving the element to take up slack in said brakes, said means embodying means for increasing the leverage ratio of said pedal, a fluid motor for operating said first named means and means including a valve on said pedal and operable by the operator without movement of the pedal for controlling said fluid motor means.

8. In braking mechanism, a movable element for operating the brakes, a lever for actuating said element, means for changing the leverage ratio of said lever, power means for controlling said leverage ratio changing means, and means on the lever operable without movement of the lever for controlling said power means.

9. In braking mechanism, a brake pedal, a longitudinally movable rod for operating the brakes, a toggle connection between the rod and the pedal, means comprising a fluid motor for actuating the toggle connection to move the rod longitudinally to take up slack in the braking mechanism, and means comprising a valve on the pedal and operable by the operator for controlling said last named means without movement of the pedal.

10. In braking mechanism provided with a movable element for operating the brakes and a brake pedal for actuating said element, fluid pressure-operated means for taking up slack in said brakes and for simultaneously increasing the leverage ratio of said pedal, said means being operable without movement of the pedal, and means comprising a valve on said pedal for controlling said fluid pressure-operated means.

11. In braking mechanism, a brake pedal provided with a surface inclined with respect to a vertical axis when the pedal is in an inoperative position, a longitudinally movable element for operating the brakes and provided with means engaging said inclined surface of the pedal, means comprising a fluid motor operable independently of any movement of the pedal for moving the means of said element on the inclined surface whereby the element will be moved longitudinally to take up slack in the braking mechanism, a pedal pad, and means including a valve for governing the operation of the fluid motor and controlled by the pedal pad.

12. In fluid braking apparatus, a fluid braking system comprising a cylinder and a piston, a reservoir in communication with the cylinder when the piston is in retracted position, a pedal having a pad, means connecting said pedal to said piston for applying pressure to the fluid system to actuate the brakes, fluid pressure-operated means for moving said piston independently of the pedal to cut off communication between the reservoir and the cylinder and place the fluid under a slight pressure, and means comprising a valve on the pedal pad operable by the placing of the operator's foot upon the pedal pad and without movement of the pedal for operating the fluid pressure-operated means.

STEVE SCHNELL.